United States Patent [19]
Nagao et al.

[11] Patent Number: 5,348,811
[45] Date of Patent: Sep. 20, 1994

[54] RECORDING MEDIUM AND METHOD OF PERFORMING RECORDING/PRODUCING ON THE RECORDING MEDIUM

[75] Inventors: Makoto Nagao; Goro Akashi, both of Kanagawa, Japan

[73] Assignee: Fuji Photo Film Co., Ltd., Kanagawa, Japan

[21] Appl. No.: 338,509

[22] Filed: Apr. 14, 1989

Related U.S. Application Data

[63] Continuation of Ser. No. 78,085, Jul. 27, 1987, abandoned.

[30] Foreign Application Priority Data

Jul. 25, 1986 [JP] Japan .................. 61-173867
Jul. 25, 1986 [JP] Japan .................. 61-173868

[51] Int. Cl.$^5$ ................ B32B 9/00; G11B 3/70
[52] U.S. Cl. ................ 428/699; 428/167; 428/172; 428/432; 428/433; 428/434; 428/469; 428/615; 428/621; 428/628; 428/693; 428/694 MT; 428/694 RE; 428/694 BM; 428/694.56; 428/697; 428/908; 346/135.1; 369/286; 369/288
[58] Field of Search ........ 430/296, 270, 945; 428/432, 64, 65, 615, 628, 908, 913, 131, 137, 138, 172, 167, 212, 425.9, 433, 434, 469, 621, 900, 693, 694 MT, 694 RE, 694 BM, 694 SG, 697, 699; 346/135.1, 762; 369/272, 286, 288, 277

[56] References Cited

U.S. PATENT DOCUMENTS

| | | | |
|---|---|---|---|
| 4,345,261 | 8/1982 | Wilkinson | 346/76 L |
| 4,370,391 | 1/1983 | Mori et al. | 428/697 |
| 4,394,661 | 7/1983 | Peeters | 430/945 |
| 4,461,807 | 7/1984 | Mori et al. | 428/469 |
| 4,499,178 | 2/1985 | Wada et al. | 430/495 |
| 4,500,889 | 2/1985 | Wada et al. | 346/1.1 |
| 4,531,183 | 7/1985 | Morimoto et al. | 346/135.1 |
| 4,650,742 | 3/1987 | Goto et al. | 430/271 |
| 4,657,816 | 4/1987 | Siddig | 428/403 |
| 4,668,609 | 5/1987 | Seiwatz | 430/942 |
| 4,710,418 | 12/1987 | Takano et al. | 428/469 |

*Primary Examiner*—Donald J. Loney
*Attorney, Agent, or Firm*—Sughrue, Mion, Zinn, Macpeak & Seas

[57] ABSTRACT

A recording medium and method of performing recording/reproducing on the recording medium. The recording medium includes a multi-layer structure wherein at least two kinds of atomic layers are alternately laminated on a support. The elements of the atomic layers are selected so that they have secondary electron emission characteristics, such as secondary electron emission efficiency or secondary electron energy spectrums different from each other and do not form any alloy with each other, or so that a reacted mixture between the at least two kinds of atomic layers has secondary electron characteristics different from the atomic layers. The recording is performed by irradiating the surface of the recording medium with a recording beam selected from an electron beam, a charged particle beam, and a neutral particle beam to expose the next lower different kind of atomic layer of forma mixture. The reproducing is performed by irradiating the surface of the recording medium carrying information recorded thereon with a reproducing beam selected from the electron beam, a charged particle beam, and a neutral particle beam to emit secondary electrons from its surface thereof, and detecting the difference in the secondary electron emission characteristic between the emitted secondary electrons.

13 Claims, 2 Drawing Sheets

RECORDING MEDIUM AND METHOD OF PERFORMING RECORDING/PRODUCING ON THE RECORDING MEDIUM

This is a continuation of application Ser. No. 07/078,085, filed Jul. 27, 1987 now abandoned.

BACKGROUND OF THE INVENTION

1. Field of the Invention

The present invention relates to a novel recording medium and a recording/reproducing method for such a recording medium, and particularly relates to an extra-high density recording medium and a method of recording/reproducing information on such a recording medium with high density by using an electron beam, a charged particle beam, or a neutral particle beam in a vacuum.

2. Prior Art

Conventionally, various kinds of high density recording media and methods of recording/reproducing information on the recording media have been known. Of those known methods, typical ones are magnetic recording methods and photo recording methods.

In the cases of recording by using magnetism or light, the bit density is about 1.0 through 0.5 μm in terms of a recording wave length. In the magnetic recording, it is considered that the theoretically possible shortest recording wave length is about 100 Å which is the minimum particle size which can exist as a ferromagnetic material. Nowadays, however, the recording shortest wave length is about 1 μm through 0.7 μm in view of a limitation in devices such as a magnetic head used for recording/reproducing, and the like. In light recording, on the other hand, the bit density is limited owing to the diameter of a light beam used for recording/reproducing, so that the recording minimum wave length is about 1 μm.

Instead of those methods, demands for a method for realizing a higher bit density have become strong in various kinds of technical fields.

SUMMARY OF THE INVENTION

In response to the demands, an object of the present invention is to provide a novel extra-high bit density recording medium and a recording/reproducing method for a such a medium so as to make it possible to perform recording/reproducing with a bit density higher than that in the conventional magnetic/photo recording.

In order to solve the above problems in the prior art, according to a first aspect of the present invention, the recording medium having a multi-layer structure comprising at lease two kinds of atomic layers respectively having secondary electron emission characteristics different from each other are alternately laminated on a support, wherein the uppermost of the atomic layers is removed by means of recording beam irradiation and elements constituting adjacent ones of the atomic layers, do not substantially form any alloy with each other.

According to a second aspect of the present invention, the recording medium comprising a multi-layer structure in which atomic layers are alternately laminated on a support, is characterized in that elements constituting the atomic layers are selected so that the elements in adjacent ones of the atomic layers form a mixture having a secondary electron emission characteristic different from those of the atomic layers between the adjacent atomic layers.

According to a third aspect of the present invention, the method of performing information recording/reproducing comprises the steps of: preparing a recording medium comprising a multi-layer structure wherein at least two kinds of atomic layers respectively having secondary electron emission characteristics different from each other are alternately laminated on a support and elements constituting adjacent ones of the atomic layers do not substantially form any alloy with each other; putting the recording medium in a vacuum atmosphere so as to remove the uppermost one of the atomic layers by using a recording or erasing beam selected from an electron beam, a charged particle beam, and a neutral particle beam to expose the next lower different kind atomic layer on a surface of the multi-layer structure to thereby perform inform recording, correction or erasing; and irradiating the surface of the recording medium having information recorded thereon with a reproducing beam selected from the electron beam, the charged particle beam, and the neutral particle beam so as to make the recording medium emit secondary electrons from the surface thereof to thereby reproduce the recorded information by reading differences in secondary electron emission characteristic depending on places where the secondary electrons are emitted.

According to a fourth aspect of the present invention the method of performing information recording/reproducing comprises the steps of: preparing a recording medium having a multi-layer structure wherein atomic layers are alternately laminated on a support; putting the recording medium in a vacuum atmosphere so as irradiate a surface of the recording medium with a recording beam selected from an electron beam, a charged particle beam, and a neutral particle beam to form a mixture having a secondary electron emission characteristic different from those the atomic layers between the adjacent atomic layers to thereby perform information record; irradiating the surface of the recording medium carrying information recorded thereon with a reproducing beam selected from the electron beam, the charged particle beam, and the neutral particle beam so as to make the recording medium emit secondary electrons from the surface thereof to thereby reproduce the recorded information by reading differences in secondary electron emission characteristic depending on places where the secondary electrons are emitted.

According to a fifth aspect of the present invention, the method of performing information recording/reproducing comprises the steps of: preparing a recording medium comprising a multi-layer structure wherein atomic layers are alternately laminated on a support; putting the recording medium in a vacuum atmosphere so as to irradiate a surface of the recording medium with a recording beam selected from an electron beam, a charged particle beam, and a neutral particle beam to form a mixture having a secondary electron emission characteristic from those of the atomic layers between the adjacent atomic layers to thereby perform information record; removing a portion where the mixture has been formed through plasma etching or chemical spattering to perform record erasure; irradiating the surface of the recording medium carrying information recorded thereon with a reproducing beam selected from the electron beam, the charged particle beam, and the neutral particle beam so as to make the recording medium emit secondary electrons from the surface thereof to thereby reproduce the recorded information by reading differences in secondary electron emission characteristic depending on places where the secondary electrons are emitted.

DETAILED DESCRIPTION OF THE INVENTION

The present invention will be described in detail hereunder.

FIG. 1 illustrates in section an embodiment of the recording medium of the present invention, where the cross-section (a) shows the arrangement of the recording medium, the cross-section (b) shows the state of the same in recording, the cross-section (c) shows the state of the same in erasing a recorded portion, the cross-section (d) shows the state in which record is added, and the cross-section (e) shows the state in erasing the record entirely.

Figure 1A:
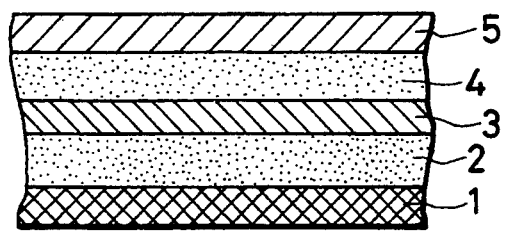
FIG. 1 illustrates in section an embodiment of the recording medium of the present invention, where the cross-section (a) shows the arrangement of the recording medium, the cross-section (b) shows the state of the same in recording, the cross-section (c) shows the state of the same in erasing a recorded portion, the cross-section (d) shows the state in which record is added, the cross-section (e) shows the state in erasing the record entirely.

FIG. 1(a) shows an embodiment of the recording medium according to the present invention. The recording medium has a four-layer structure of at least two kinds of atomic layers having secondary emission characteristics different from each other, that is, a first kind of atomic layer 2, a second kind of atomic layer 3, the first kind of atomic layer 4, and the second kind of atomic layer 5 are alternately repeatedly laminated on a support 1, so that the uppermost layer is removed by means of irradiation with a recording beam, and so that any two of the atomic layers adjacent to each other do not substantially form any alloy therebetween.

Figure 1B:
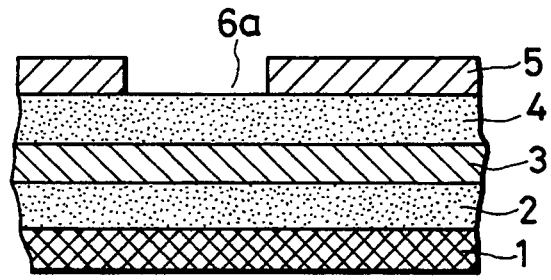

FIG. 1(b) is a cross-section showing an information recorded portion 6a formed by removing a part of the second atomic layer 5, that is, the uppermost layer in the surface of the recording medium by applying a recording beam onto the recording medium. The recorded information can be reproduced by irradiating the surface of the recording medium carrying the information recorded thereon with a reproducing beam selected from an electron beam, a charged particle beam, and a neutral beam to thereby read a difference in emission characteristic, at the recording portion 6a, between the secondary electrons emitted from the uppermost layer, that is, the second atomic layer 5.

Figure 1C:
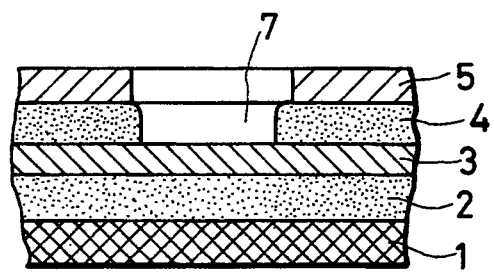

FIG. 1(c) illustrates the state in which the recorded portion 6a in FIG. 1(b) is erased. The recorded portion 6a is irradiated with an erasing beam to thereby remove the first atomic layer 4 and produce an erased portion 7, so that the second atomic layer 3 appears at the surface of the erased portion 7. Accordingly, the difference in emission characteristic between the secondary electrons emitted from the second atomic layer 3 and the uppermost second atomic layer 5 does not appear in reproducing, thus completing partial erasure.

Figure 1D:
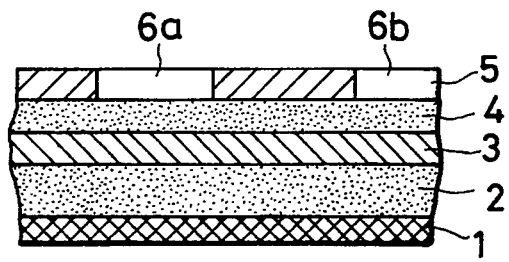

FIG. 1(d) illustrates the state in which another recorded portion 6b is added to the recorded portion 6a in the same manner as that in FIG. 1(b).

Figure 1E:
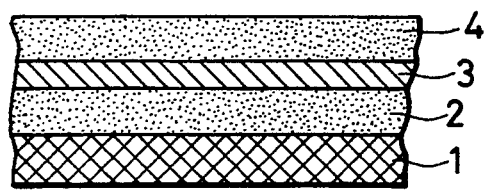

FIG. 1(e) illustrates the state in which the second atomic layer 5 is entirely removed by using an erasing beam so as to entirely erase the recorded portions 6a and 6b to thereby produce a new recording surface. Thus, the uppermost layer is formed by the first atomic layer 4.

FIG. 2 illustrates in section a second embodiment of the recording medium of the present invention, in which the cross-section (a) shows the arrangement of the recording medium, the cross-section (b) shows the state of the same in recording, the cross-section (c) shows the state of the same in erasing a recorded portion, the cross-section (d) shows the state in which record is added, and the cross-section (e) shows the state in erasing the record entirely.

Figure 2A:
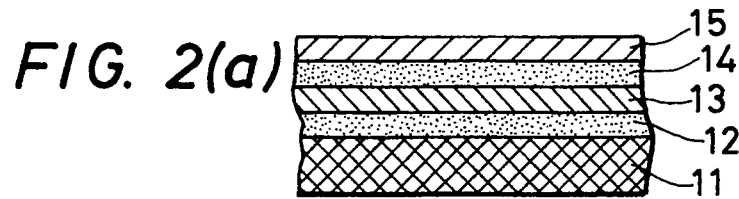
FIG. 2 illustrates in section an embodiment of the recording medium of the present invention, where the cross-section (a) shows the arrangement of the recording medium, the cross-section (b) shows the state of the same in recording, the cross-section (c) shows the state of the same in erasing a recorded portion, the cross-section (e) shows the state in which record is added, and the cross-section (e) shows the state in erasing the record entirely.

FIG. 2(a) shows a second embodiment of the recording medium according to the present invention. The recording medium has a four-layer structure of atomic layers, that is, a first kind of atomic layer 12, a second kind of atomic layer 13, the first kind of atomic layer 14, and the second kind of atomic kind of atomic layer 15 are alternately repeatedly laminated on a support 11 in a manner so that the atomic layers adjacent to each other form a mixture therebetween.

Figure 2B:
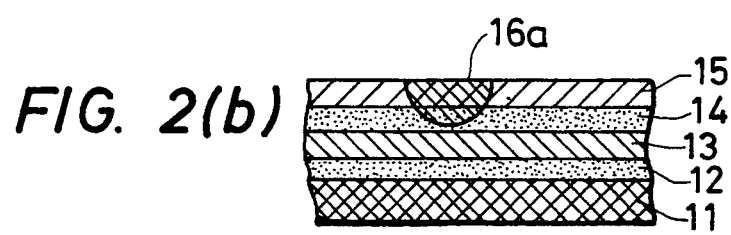

FIG. 2(b) is a cross-section showing an information recorded portion 16a formed by causing the second atomic layer 15 to partly form a mixture with the first atomic layer 14 laid directly under the second atomic layer 15 by irradiating part of the second atomic layer 15, that is, the uppermost layer is the surface of the recording medium, with a recording beam. The recorded information can be reproduced by irradiating the surface of the recording medium carrying the information recorded thereon with a reproducing beam selected from an electron beam, a charged particle beam, and a neutral beam to thereby read a difference in emission characteristic between the secondary electrons emitted from the mixture portion at the recording portion 16a and the secondary electrons emitted from the uppermost layer, that is, the second atomic layer 15.

Figure 2C:
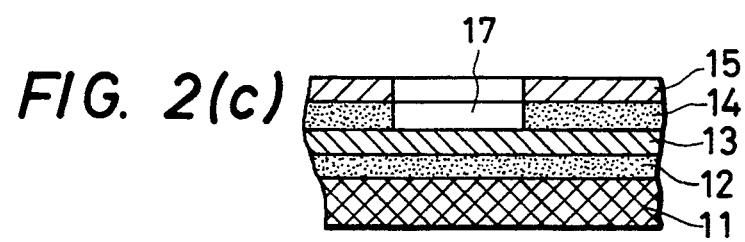

FIG. 2(c) illustrates the state in which the recorded portion 16a in FIG. 2(b) is erased. The recorded portion 6a is irradiated with an erasing beam to thereby remove the second atomic layer 15 and the first atomic layer 14 to produce an erased portion 17, so that the second atomic layer 13 appears at the surface of the erased portion 17. Accordingly, the difference in emission characteristic between the secondary electrons emitted from the second atomic layer 13 and the uppermost second atomic layer 15 does not appear in reproduction, thus completing partial erasure.

Figure 2D:
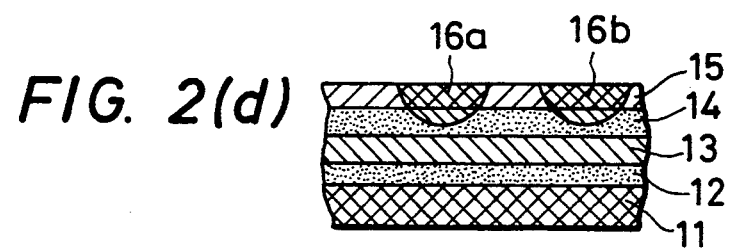

FIG. 2(d) illustrates the state in which another recorded portion 16b is added to the recorded portion 16a in the same manner as that in FIG. 2(b).

Figure 2E:
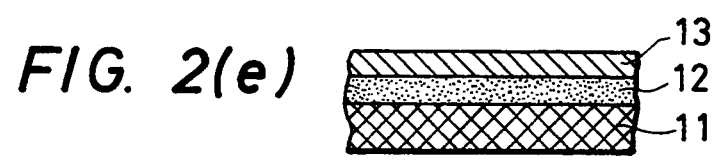

FIG. 2(e) illustrates the state in which the second atomic layer 15 and the first atomic layer 14 are entirely removed by using an erasing beam so as to entirely erase the recorded portions 16a and 16b to thereby produce a new recording surface. Thus, the uppermost layer is formed by the second atomic layer 13.

The foregoing is the summary of the present invention. Various constituent elements of the present invention will be described hereunder.

As the support according to the present invention, it is preferable to use such a material that does not emit any poisonous gas while in use in a vacuum. A metal having a smooth surface and an oxide of the metal, glass, plastic film, and the like, may be used. The shape may be plate-like or thin film like.

According to the present invention, the secondary electron emission characteristic may be, for example, a secondary electron emission efficiency, a secondary electron energy spectrum, or the like. The term "secondary electrons" used here is a general term meaning electrons emitted from an object when the object is irradiated with a reproducing beam selected from an electron beam, a charged particle beam, and a neutral particle beam, and the secondary electrons include Auger electrons.

To perform reading-out in the reproduction of recorded information, in view of intensity of the output it is preferable to employ a system in which the secondary electron emission efficiency is detected. Bearing in mind that the detection is not affected by the unevenness on the surface of a solid, it is preferable to use a system in which the energy spectrum is detected.

The atomic layers according to the present invention are formed through a vacuum evaporation method or a spattering method.

Each of the alternately laminated at least two kinds of atomic layers different in secondary electron emission characteristic according to the present invention, may be composed of a single element or more than one kind elements.

The term of "at least two kinds of atomic layers" according to the present invention means that two kinds of atomic layers are most general but atomic layers of three kinds of more may be used if necessary.

In the first embodiment, the two kinds of atomic layers having different secondary electrons emission characteristic are preferably composed of first kind of atomic layers having a high secondary electron emission efficiency and second kind of atomic layers having a low secondary electron emission efficiency.

As preferable atomic layers having a high secondary electron emission efficiency, the following have been known:

Ag—Mg, Cs—Te, Sb—Cs, Cu—Be, Ga—As—Cs, Ga—As—P, Ga—P, Cs, Na, Li, Ca, Ag—O—Cs, etc.

As preferable atomic layers having a low secondary electron emission efficiency, the following have been known:

As, Ag, Al, Au, Be, Bi, C, Cd, Co, Cr, Cu, Ga, Ge, Mo, Ni, Pt, Re, Sb, S, Su, Ti, Ta, Te, V, W, Zn, Zr, Ir, Bi—Te, Na—Cl, etc.

As the uppermost layer in the multi-layer structure according to the present invention, any one of the atomic layers having a low secondary electron emission efficiency or having a high secondary electron emission efficiency is selected in accordance with the use.

In the case where an energy spectrum is detected as described above, layers having an amorphous structure are desirable to reduce noises generated in a particle field during reproduction.

The amorphous structures have been known as follows:

Si, Ge, Ga—Sb, Ga—p, Ga—As, In—Sb, Cd—Ge—P, Cd—Ge—As, Zn—Sn—As, In—Se, Ga—Se, In—Te, Ga—Te, In—Se, N—Si, C, As, Sb, (As, Sb, Si)—(S, Se, Te), Se, Te, B, ionic bond-glass oxide ($Fe_2O_3$—$AL_2O_3$—$SiO_2$), molecule amorphous semiconductor ( Si—O, Al—O, Si—N, B—N, . . . )

Be, Bi, Co, Cr, Fe, Ga, Mn, Nb, Ni, Pd, Sb, Se, Te, Ti, V, Y, Ag—Cu, Ag—Ni, Au—Co, Au—Cn, Au—Fe, B—(Co, Fe, Ni), B—Fe, B—Co—Fe, Bi—Mg, Bi—Pb, Cu—Sn, Fe—Ge, Fe—Ni, Fe—Si, Ni—P, rare earth transition metals (Gd—Fe, Gd—Fe—Co . . . ) Fe—P—C—, Co—P, Ge—S, Ge—Se, Ge—As—Te, etc.

The amorphous structure is not limited specifically to those listed above but any other structure may be used so long as the structure has an amorphous property. By alternately laminating atomic layers composed of the above components of at least two kinds, the recording medium according to the first embodiment can be obtained.

According to the first embodiment, the number of layers constituting the multi-layer structure in which at least two kinds of atomic layers having different secondary electron emission characteristics are alternately laminated, is not always limited to four, and more than four layers may be preferably laminated when multiple recording and erasing steps are to be carried out.

Preferably, the thickness of each of the atomic layers according to the present invention is selected to be 10-100 Å, because if each layer is too thin secondary electrons may be emitted from the layer laid immediately under the surface layer so that the S/N ratio becomes insufficient. If each layer is too thick, the time required for removing a necessary portion of the layer in recording or in erasing.

According to the first embodiment, it is necessary to arrange the atomic layers such that the uppermost layer may be removed by a recording beam, and the layers are combined so that the adjacent layers substantially do not form any alloy therebetween.

The most preferable combination of the compositions described above is that composed of layers formed of at least one of C, Co, Ni, Mo, Ti, Ta, W, and Al as the atomic layers having a low secondary electron emission efficiency, and layers formed of at least one of Ag—Mg, Cs—Ts, Sb—Cs, Cu—Be, Ga—As—P as the atomic layers having a high secondary electron emission efficiency.

The elements of charged particles or neutral particles for generating a recording or an erasing beam to be used according to the first embodiment are gaseous at an ordinary temperature. For example, the elements includes Ar, N, O, Cl, and F, or at least one of them.

The electron beam, the charged particle beam, or the neutral particle beam used as a recording/erasing beam according to the first embodiment is required to have energy which is large enough to remove the uppermost layer of the recording medium.

Furthermore, in the second embodiment, it is necessary to form the layer structure in a manner so that any two of the adjacent atomic layers can form a layer containing a mixture of the elements of the two layers having a secondary electron emission characteristic different from that of a layer composed of only a single element unit.

As preferable mixtures having a high secondary electron emission efficiency, the following have been known:

Ag—Mg, Cs—Te, Sb—Cs, Cu—Be, Ga—As—Cs, Ga—As—P, Ga—O, Ag—O—Cs etc.

As preferable mixtures having a low secondary electron emission efficiency, Bi—Te, Na—Cl, etc., have been known. Accordingly, it is preferable to make respective adjacent atomic layers of one or two kinds of the components of the mixtures described above so that the mixtures are formed by irradiation of a recording beam.

When an energy spectrum of secondary electrons is detected, it is preferable that the mixture to be produced has an amorphous structure to reduce noises generated in a particle field during reproduction.

The amorphous structures have been knows as follows:

Ga—Sb, Ga—P, Ga—As, In—Sb, Cd—Ge—P, Cd—Ge—As, Zn—Sn—As, In—Se, Ga—Se, In—Te, Ga—Te, In—S, N—Si, (As, Sb, Si)—(S, Se, Te), ionic bond-glass oxide ($Fe_2O_3$—$Al_2O_3$—$SiO_2$), molecule amorphous semiconductor (Si—O, Al—O, Si—N, B—N, . . . )

Ag—Cu, Ag—Ni, Au—Co, Au—Cn, Au—Fe, B—(Co, Fe, Ni), B—F, B—Co—Fe, Bi—Mg, Bi—Pb, Cu—Sn, Fe—Ge, Fe—Ni, Fe—Si, Ni—P, rare earth transition metals (Gd—Fe, Gd—Fe—Co . . . ), Fe—P—C, Co—P, Ge—S, Ge—Se, Ge—As—Te, etc.

The amorphous structure is not limited specifically to those listed above but any other structure may be used so long as the structure has an amorphous property. It is preferable that adjacent atomic layers are formed by one or more component elements forming the above listed amorphous alloys.

According to the second embodiment, the number of layers constituting the alternately laminated multi-layer structure, is not always limited to four layers, and more than four may be preferably laminated when many recording and erasing steps are to be carried out.

Preferably, the thickness of each of the atomic layers according to the present invention is selected to be 10–100 Å because if the layers are too thin secondary electrons may be emitted from the layer immediately under the surface layer so that the S/N ratio becomes insufficient. If the layers are too thick it takes too much time to remove a necessary portion of the layer during recording or erasing.

It is preferable the atomic layers be selected so that when a mixture is produced between upper and lower atomic layers, the difference in electron emission efficiency between the atomic layer composed of elements and the atomic layer composed of alloys are large. The most preferable selection of the elements forming the atomic layers is such that when a mixture is formed between adjacent atomic layers the composition of the mixture becomes Ag—Mg, Cs—Te, Sb—Cs, Cu—Be, o r Ga—As—P.

The elements of charged particles or neutral particles for generating a recording beam to be used according to the second embodiment are gaseous and inert at an ordinary temperature. For example, the elements include Ar or N.

The recording beam to be used according to the second embodiment is selected from an electron beam, a charged particle beam, and a neutral particle beam and is required to have energy which is large enough to cause a part of the uppermost atomic layer of the recording medium and the lower atomic layer laid directly under the former to form a mixture therebetween.

According to the second embodiment, record erasure is performed through plasma etching or chemical spattering so that mixing does not progress between upper and lower adjacent atomic layers. The term of "chemical spattering" means spattering accompanying a reaction between a discharge gas and a target.

Preferably, the elements of charged particles or neutral particles for generating an erasing beam to be used according to the second embodiment are those containing Cl, C, O, S, F, H, At, N, etc., for example, $CF(+O_2, H_2)$, $CCl_4$, etc. In order to perform recording erasure when alloying does not progress between upper and lower adjacent atomic layers, it is preferable to irradiate the recording medium with a beam while cooling the recording medium.

According to the invention, the neutral particle beam or the charged particle beam to be focused on the surface of the recording medium can be stopped down to a depth of about 300 Å or less. Accordingly, recording with a high bit density of about $10^{10}$ bit/cm$^2$ can be carried out.

The strength of energy of a reproducing beam by means of a electron beam, a charged particle beam, or a neutral particle beam, according to the present invention, is adjusted to an extent that the beam can cause the surface of the atomic layer to emit secondary electrons without removing the surface of the recording medium. The beam may be stopped down a thin with diameter in use similarly to a recording/erasing beam.

The electron beam is the most desirable one in view of the controllability as well a the ease with which the depth beams penetrate to can be controlled.

EXAMPLE 1

An atomic layer of Sb—Cs as a first atomic layer and an atomic layer of Mo as a second atomic layer each having a thickness of 100 Å were alternately repeatedly formed on a support Ni plate through an opposite target spattering method to thereby produce a recording medium composed of four layers.

While the recording medium was cooled, ions of Ar$^+$ were converged into a beam of a diameter of 500 Å so as to dot-like irradiate the recording medium, so that the irradiated portion of the Ni layer which was the uppermost second atomic layer was removed to thereby record information at that portion.

As a result of observation of the film surface by scanning with an electron beam in an accelerating electric field of 25 KV by using an electron microscope of the electric-field radiation scanning type, a bright pattern in the form of dot having a diameter of about 500 Å was read out.

EXAMPLE 2

An atomic layer of Be as a first atomic layer and an atomic layer of Cu as a second atomic layer each having a thickness of 100 Å were alternately repeatedly formed on a support Cu plate cooled in a vacuum by a magnetron spattering method to thereby produce a recording medium composed of four layers.

While the recording medium was cooled, ions of Ar$^+$ were converged into a beam of a diameter of 500 Å so as to dot-like irradiate the recording medium, so that a mixture layer of Cu—Be is formed to record between the uppermost second atomic layer of Cu and the lower first atomic layer of Be laid under the former.

As a result of observation of the film surface by scanning with an electron beam in an accelerating electric field of 25 KV by using an electron microscope of the electric-field radiation scanning type, a bright pattern in the form of dot having a diameter of about 500 Å was read out.

As described above, according to the recording mediums and methods of recording/reproducing on the recording mediums of this invention, information recording/reproducing can be obtained in which recording, addition, correction, and erasure of information can be carried out as desired with significantly higher density than those of prior art.

What is claimed is

1. A multi-layer recording medium, comprising:
a support;
at least one first metal layer; and
at least two second metal layers having secondary electron emission characteristics different from said first metal layer, with one of said second metal layers being formed on said support, said first metal layer being laminated between said second metal layers with respective adjacent layers being made of different kinds of metal from one another, and the other of said second metal layers having portions thereof selectively removed to expose said first metal layer to thereby represent information recorded in said recording medium.

2. A recording medium as claimed in claim 1, wherein said portions of said second metal layer are removable by means of irradiation by a recording beam, and [wherein elements constituting any one of said metal layers will not substantially form any alloy with elements constituting any adjacent one of said metal layers.

3. A recording medium as claimed in claim 2, wherein said secondary electron emission characteristics of said at least one first metal layer and said at least two second metal layers both comprise the same one of the group consisting of a secondary electron emission efficiency and a secondary electron energy spectrum.

4. A recording medium as claimed in claim 2, wherein said recording beam comprises a beam selected from the group consisting of an electron beam, a charged particle beam and a neutral particle beam.

5. A recording medium as claimed in claim 1, wherein said support comprises a material selected from the group consisting of a metal having a smooth surface, an oxide of said metal, glass and plastic film.

6. A recording medium as claimed in claim 1, wherein said first metal layer and second metal layers have different secondary electron emission efficiency from one another.

7. A recording medium as claimed in claim 1, wherein said first metal layer is formed of a material having a higher secondary emission efficiency than the material of said second metal layers and wherein said material having a higher secondary emission efficiency is selected from the group consisting of:

Ag—Mg, Cs—Te, Sb—CS, Cu—Be, Ga—As—Cs, Ga—Cs—P, Ga—P, Cs, Na, Li, Ca, and Ag—O—Cs.

8. A recording medium as claimed in claim 6, wherein one of said at least one first metal layer and said at least two second metal layers is formed of materials having low secondary electron emission efficiency.

9. A recording medium as claimed in claim 6, wherein said first metal layer is formed of a material having a lower secondary emission efficiency than the material of said second metal layers, and wherein said material having lower secondary emission efficiency is selected from the group consisting of:

As, Ag, Al, Au, Be, Bi, C, Cd, Co, Cr, Cu, Ga, Ge, Mo, Ni, Pt, Re, Sb, S, Ti, Ta, Te, V, W, Zn, Zr, Ir, Bi—Te, and Na—Cl.

10. A recording medium as claimed in claim 1, wherein each of said second metal layers is formed of a material having a higher secondary emission efficiency than the material of said first metal layer.

11. A recording medium as claimed in claim 6, wherein said second metal layers are formed of a material having a higher secondary emission efficiency than the material of said first metal layer, and wherein said material having higher secondary electron emission efficiency is selected from the group consisting of:

Ag—Mg, Cs—Te, Sb—CS, Cu—Be, Ga—As—Cs, Ga—Cs—P, Ga—P, Cs, Na, Li, Ca, and Ag—O—Cs.

12. A recording medium as claimed in claim 6, wherein said second metal layers are formed of a material having a lower secondary emission efficiency than the material of said first metal layer, and wherein said material having lower secondary emission efficiency is selected from the group consisting of:

As, Ag, Al, Au, Be, Bi, C, Cd, Co, Cr, Cu, Ga, Ge, Mo, Ni, Pt, Re, Sb, S, Ti, Ta, Te, V, W, Zn, Zr, Ir, Bi—Te, and Na—Cl.

13. A multi-layer recording medium carrying information thereon, said medium comprising:
a support;
at least one first metal layer; and
at least two second metal layers having secondary electron emission characteristics different from said first metal layer, with one of said second metal layers being formed on said support, said first metal layer being disposed between said second metal layers with respective adjacent layers being of different kinds of metal from one another, and the other of said second metal layers having gaps therein for exposing said first metal layer to thereby represent said information.

* * * * *